(12) United States Patent
Reagor et al.

(10) Patent No.: US 11,521,103 B1
(45) Date of Patent: Dec. 6, 2022

(54) UTILIZING MULTIPLE QUANTUM PROCESSOR UNIT (QPU) INSTANCES

(71) Applicant: Rigetti & Co, LLC, Berkeley, CA (US)

(72) Inventors: Matthew J. Reagor, Corte Madera, CA (US); Blake Robert Johnson, El Cerrito, CA (US); Marcus Palmer da Silva, Lafayette, CA (US); Johannes Sebastian Otterbach, Oakland, CA (US); Nikolas Anton Tezak, Oakland, CA (US); Chad Tyler Rigetti, Walnut Creek, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 1029 days.

(21) Appl. No.: 16/218,024

(22) Filed: Dec. 12, 2018

Related U.S. Application Data

(60) Provisional application No. 62/597,787, filed on Dec. 12, 2017.

(51) Int. Cl.
*G06N 10/00* (2022.01)
*G06F 15/80* (2006.01)

(52) U.S. Cl.
CPC .............. *G06N 10/00* (2019.01); *G06F 15/80* (2013.01)

(58) Field of Classification Search
CPC .................................. G06N 10/00; G06F 15/80
See application file for complete search history.

(56) References Cited

U.S. PATENT DOCUMENTS

2016/0292586 A1 10/2016 Rigetti et al.
2018/0096085 A1 4/2018 Rubin
2018/0260245 A1 9/2018 Smith
2018/0260730 A1 9/2018 Reagor et al.
2018/0365585 A1 12/2018 Smith et al.
2020/0285539 A1* 9/2020 Fowler ................ G06F 11/1076

OTHER PUBLICATIONS

"Variational-Quantum-Eigensolver (VQE)", Rigetti Quantum Computing, available at http://grove-docs.readthedocs.io/en/latest/vqe.html, Copyright 2016, 2016, 12 pgs.
Bauer, Bela, et al., "Hybrid quantum-classical approach to correlated materials", 1510.03859v2 [quant-ph], Aug. 29, 2016, 11 pgs.
Johnson, et al., "QVECTOR: an algorithm for device-tailored quantum error correction", arXiv:1711.02249v1 [quant-ph], Nov. 7, 2017, 16 pgs.
McClean, Jarrod R., et al., "The theory of variational hybrid quantum-classical algorithms", arXiv:1509.04279v1 [quant-ph], Sep. 14, 2015, 20 pages.
O'Malley, et al., "Scalable Quantum Simulation of Molecular Energies", arXiv:1512.06860v2 [quant-ph], Feb. 4, 2017, 13 pgs.
Peruzzo, et al., "A variational eigenvalue solver on a quantum processor", ArXiv:1304.3061v1 [quant-ph], Apr. 10, 2013, 10 pgs.
Rubin, "A Hybrid Classical/Quantum Approach for Large-Scale Studies of Quantum Systems with Density Matrix Embedding Theory", arXiv: 1610.06910v2, Oct. 24, 2016, 10 pgs.

* cited by examiner

*Primary Examiner* — Jung Kim

(74) *Attorney, Agent, or Firm* — Henry Patent Law Firm PLLC

(57) ABSTRACT

In a general aspect, a plurality of distinct quantum processor unit (QPU) instances are utilized to execute a quantum computation. Hybrid classical-quantum computing methods and systems are described which utilize the plurality of QPU instances in the execution of quantum computations.

22 Claims, 8 Drawing Sheets

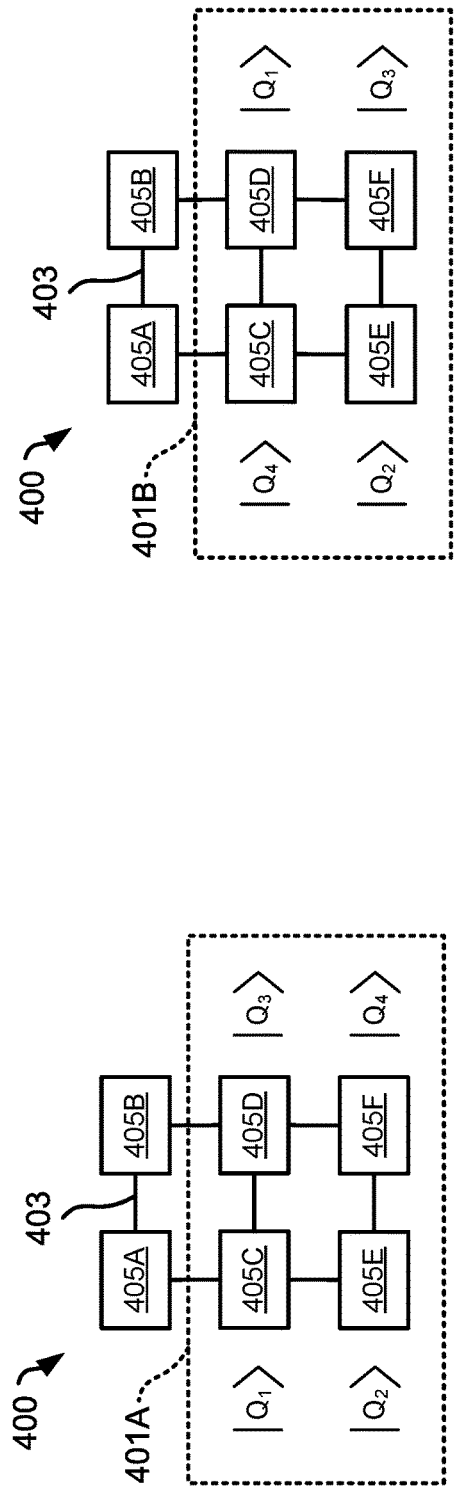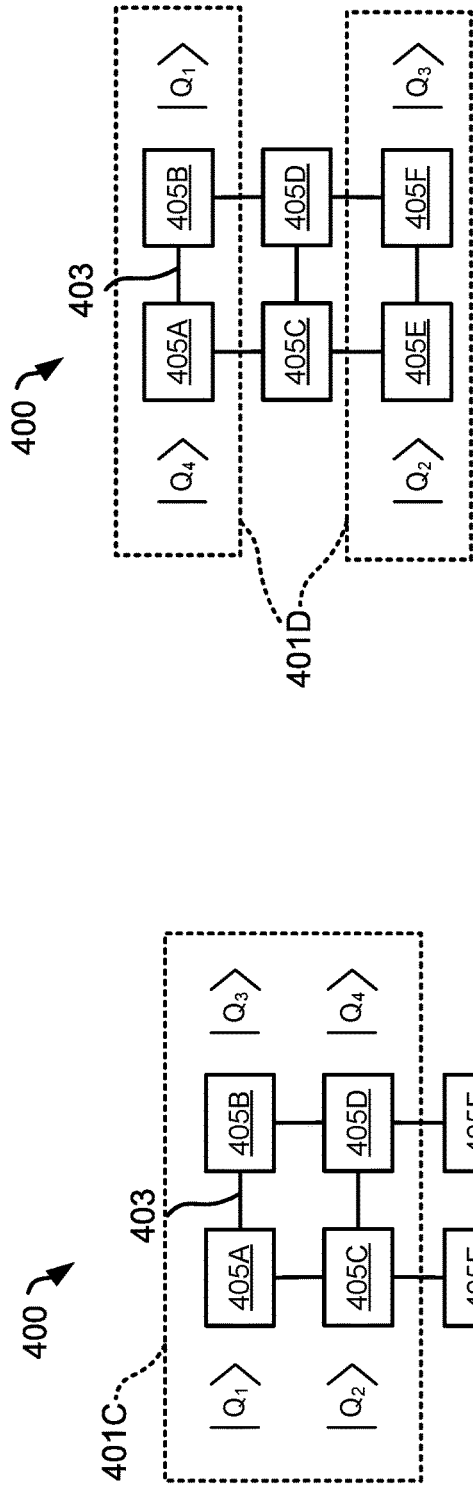

UTILIZING MULTIPLE QUANTUM PROCESSOR UNIT (QPU) INSTANCES

CROSS-REFERENCE TO RELATED APPLICATIONS

This application claims priority to U.S. Provisional Application Ser. No. 62/597,787 entitled "Utilizing Multiple Quantum Processor Unit (QPU) Instances" and filed on Dec. 12, 2017. The priority application is incorporated herein by reference.

BACKGROUND

The following description relates to utilizing multiple quantum processor unit (QPU) instances.

Quantum computing resources can store and process information in quantum systems, which can be sensitive to noise. Techniques have been proposed to mitigate the effects of noise in quantum computers. For example, individual quantum logic gates can be configured to maximize quantum process fidelity or to optimize some other heuristic in the presence of noise. As another example, quantum error correcting codes have been proposed to actively correct errors produced by noise.

DESCRIPTION OF DRAWINGS

FIGS. 4A, 4B, 4C, and 4D are diagrams collectively showing a set of four distinct quantum processor unit (QPU) instances in an example quantum processor cell.

DETAILED DESCRIPTION

Figure 1:
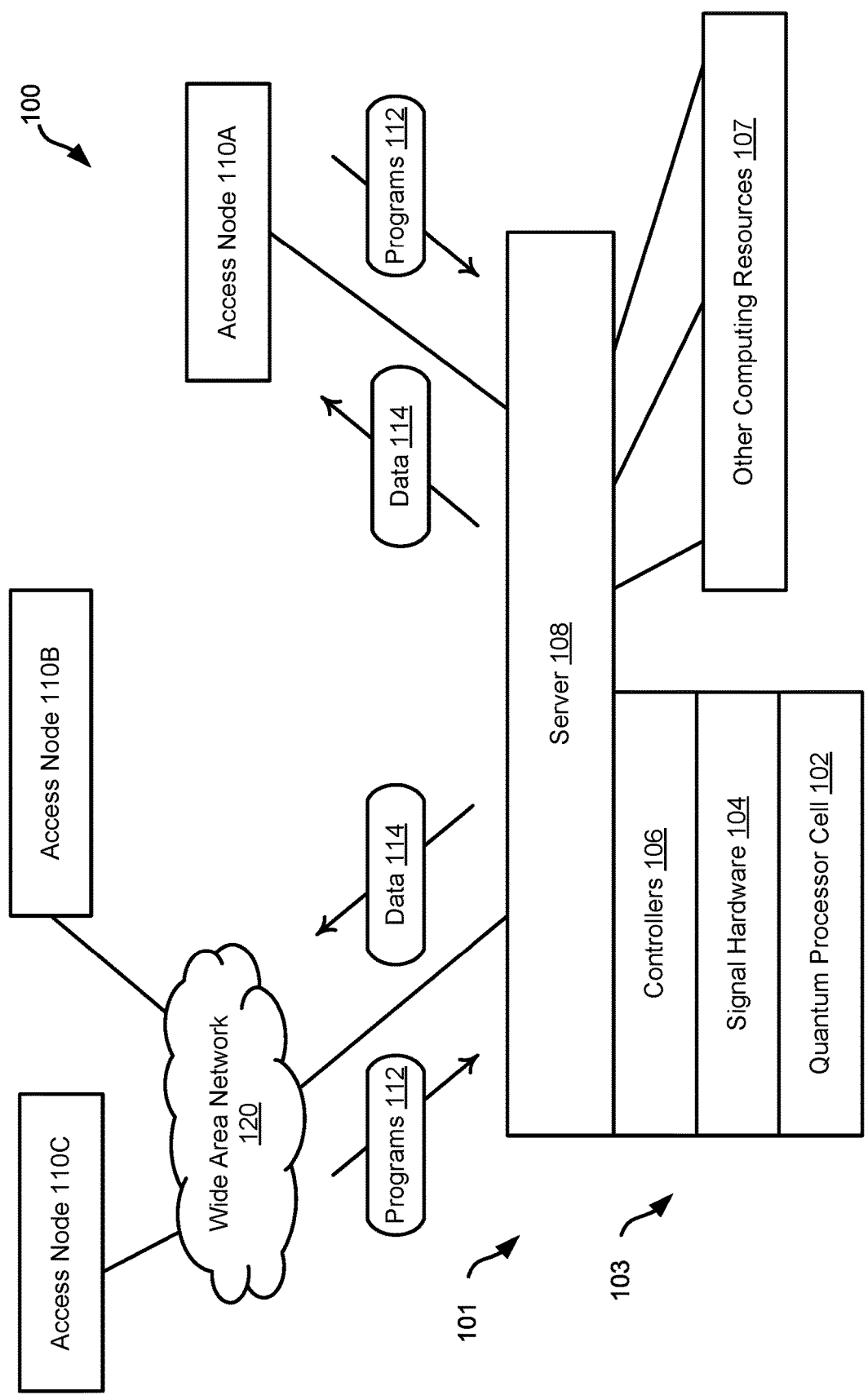
FIG. 1 is a block diagram of an example computing system.

Operational errors that occur within quantum computing systems can have effects that are difficult to predict or even understand post-hoc. For instance, quantum computers may perform computations that cannot be efficiently reproduced or analyzed with known classical computing resources. However, in some cases, results from some quantum algorithms can be verified classically or they may be known to comply with certain guarantees. For instance, the accuracy of the output of a factoring algorithm can be verified using classical computing resources. As another example, Quantum Variational Eigensolver (QVE) type routines compute an upper bound on a global minimum for the problem under study, even with imperfect operations.

According to the systems and techniques described here, results from multiple executions of a quantum algorithm can be evaluated for verification or interpretation of algorithmic guarantees to determine the most accurate result. Such techniques can boost the accuracy of quantum algorithms, at least for certain operational error pathologies. For example, the quantum processor hardware may have error rates and processes that are variable across the system, and the variability can be leveraged for computational advantage by distributing a quantum computation over a multitude of independent executions on distinct subdomains of the processor hardware. For example, a quantum algorithm may be executed on multiple quantum processor unit (QPU) instances, which may be, for instance, sub-units of a single physical quantum processor chip.

The systems and techniques described here can provide technical advantages and improvements in some cases. For example, the techniques described here may provide advantages over the use of quantum error correcting codes in some cases. For instance, adapting quantum error correction routines to the real, physical noise of each individual qubit of a quantum processor can result in finite logical operational fidelities, which may also vary across a QPU, even for robust error correction schemes. As another example, the techniques described here may provide better results than the use of heuristics as a proxy for identifying the optimal implementation of a quantum algorithm. For instance, selecting the expected-to-be-best quantum processor subdomain for a given task based on relevant metrics, such as gate fidelity, may not capture important information such as cross-talk. Moreover, in some cases, even a perfect model for error processes in a quantum process cannot always be used to explicitly predict resulting outcomes for comparison.

In some implementations, the compilation and execution of a quantum algorithm is improved when, given pre-defined evaluation criteria for the output of the quantum algorithm, a multitude of results are sampled from nominally the same quantum algorithm computed on different QPU instances. The evaluation criteria can be defined based on the quantum algorithm itself (e.g., based on the type of output that the quantum algorithm is designed to produce), independent of the execution results. Using the pre-defined evaluation criteria, a co-processor (e.g., a classical co-processor) can compute the most accurate answer from the distribution of execution results. Such techniques can be useful in a variety of quantum processor hardware systems, and may become increasingly important at scale as heuristics, such as gate fidelity and coherence times, fail to accurately predict the optimum mapping between algorithm labels (i.e. logical representations of qubits such as the horizontal bars of a quantum circuit) and physical qubits.

Accordingly, the systems and techniques described here may be utilized to achieve a more accurate answer for a quantum algorithm, which is an important performance metric for practical applications of quantum technologies. Parallelization techniques and other methodologies described here could potentially be used to improve execution time via classical methods, for instance, in hybrid classical-quantum algorithms (e.g. swarm optimizers, see, for example, Fundamentals of computational swarm intelligence, AP Engelbrecht, John Wiley & Sons 2006). Moreover, the techniques described here may be utilized in a variety of computing applications, for instance, to distribute quantum algorithms and hybrid classical-quantum algorithms (e.g., in parallel execution) over multiple QPU instances.

FIG. 1 is a block diagram of an example computing system 100. The example computing system 100 shown in FIG. 1 includes a computing environment 101 and access nodes 110A, 110B, 110C. A computing system may include additional or different features, and the components of a computing system may operate as described with respect to FIG. 1 or in another manner.

The example computing environment 101 includes computing resources and exposes their functionality to the access nodes 110A, 110B, 110C (referred to collectively as "access nodes 110"). The computing environment 101 shown in FIG. 1 includes a server 108, a quantum processor unit 103 and other computing resources 107. The computing environment 101 may also include one or more of the access nodes (e.g., the example access node 110A) and other features and components. A computing environment may include additional or different features, and the components of a computing environment may operate as described with respect to FIG. 1 or in another manner.

The example computing environment 101 can provide services to the access nodes 110, for example, as a cloud-based or remote-accessed computer, as a distributed computing resource, as a supercomputer or another type of high-performance computing resource, or in another manner. As shown in FIG. 1, to access computing resources of the computing environment 101, the access nodes 110 send programs 112 to the server 108 and in response, the access nodes 110 receive data 114 from the server 108. The access nodes 110 may access services of the computing environment 101 in another manner, and the server 108 or other components of the computing environment 101 may expose computing resources in another manner.

Any of the access nodes 110 can operate local to, or remote from, the server 108 or other components of the computing environment 101. In the example shown in FIG. 1, the access node 110A has a local data connection to the server 108 and communicates directly with the server 108 through the local data connection. The local data connection can be implemented, for instance, as a wireless Local Area Network, an Ethernet connection, or another type of wired or wireless connection. Or in some cases, a local access node can be integrated with the server 108 or other components of the computing environment 101. Generally, the computing system 100 can include any number of local access nodes.

In the example shown in FIG. 1, the access nodes 110B, 110C each have a remote data connection to the server 108, and each communicates with the server 108 through the remote data connection. The remote data connection in FIG. 1 is provided by a wide area network 120, such as, for example, the Internet or another type of wide area communication network. In some cases, remote access nodes use another type of remote data connection (e.g., satellite-based connections, a cellular network, a private network, etc.) to access the server 108. Generally, the computing system 100 can include any number of remote access nodes.

The example server 108 shown in FIG. 1 communicates with the access nodes 110 and the computing resources in the computing environment 101. For example, the server 108 can delegate computational tasks to the quantum processor unit 103 and the other computing resources 107, and the server 108 can receive the output data from the computational tasks performed by the quantum processor unit 103 and the other computing resources 107. In some implementations, the server 108 includes a personal computing device, a computer cluster, one or more servers, databases, networks, or other types of classical or quantum computing equipment. The server 108 may include additional or different features and may operate as described with respect to FIG. 1 or in another manner.

The example quantum processor unit 103 operates as a quantum computing resource in the computing environment 101. The other computing resources 107 may include additional quantum computing resources (e.g., quantum processor units, quantum virtual machines or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the server 108 generates computing jobs, identifies an appropriate computing resource in the computing environment 101 to execute the computing job, and sends the computing job to the identified resource for execution. For example, the server 108 may send a computing job to the quantum processor unit 103 or any of the other computing resources 107. A computing job can be formatted, for example, as a computer program, function, code or other type of computer instruction set. Each computing job includes instructions that, when executed by an appropriate computing resource, perform a computational task and generate output data based on input data. For example, a computing job can include instructions formatted for a quantum processor unit, a quantum virtual machine, a digital microprocessor, co-processor or other classical data processing apparatus, or another type of computing resource.

In some implementations, the server 108 operates as a host system for the computing environment 101. For example, the access nodes 110 may send programs 112 to server 108 for execution in the computing environment 101. The server 108 can store the programs 112 in a program queue, generate one or more computing jobs for executing the programs 112, generate a schedule for the computing jobs, allocate computing resources in the computing environment 101 according to the schedule, and delegate the computing jobs to the allocated computing resources. The server 108 can receive, from each computing resource, output data from the execution of each computing job. Based on the output data, the server 108 may generate additional computing jobs, generate data 114 that is provided back to an access node 110, or perform another type of action.

In some implementations, all or part of the computing environment 101 operates as a cloud-based quantum computing (QC) environment, and the server 108 operates as a host system for the cloud-based QC environment. For example, the programs 112 can be formatted as quantum computing programs for execution by one or more quantum processor units. The server 108 can allocate quantum computing resources (e.g., one or more QPUs, one or more quantum virtual machines, etc.) in the cloud-based QC environment according to the schedule, and delegate quantum computing jobs to the allocated quantum computing resources for execution.

In some implementations, all or part of the computing environment 101 operates as a hybrid computing environment, and the server 108 operates as a host system for the hybrid environment. For example, the programs 112 can be formatted as hybrid computing programs, which include instructions for execution by one or more quantum processor units and instructions that can be executed by another type of computing resource. The server 108 can allocate quantum computing resources (e.g., one or more QPUs, one or more quantum virtual machines, etc.) and other computing resources in the hybrid computing environment according to the schedule, and delegate computing jobs to the allocated computing resources for execution. The other (non-quantum) computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the server 108 can select the type of computing resource (e.g., quantum or otherwise) to execute an individual computing job in the computing environment 101. For example, the server 108 may select a particular quantum processor unit (QPU) or other computing resource based on availability of the resource, speed of the resource, information or state capacity of the resource, a performance metric (e.g., process fidelity) of the resource, or based on a combination of these and other factors. In some cases, the server 108 can perform load balancing, resource testing and calibration, and other types of operations to improve or optimize computing performance.

The example server 108 shown in FIG. 1 may include a quantum machine instruction library or other resources that the server 108 uses to produce quantum computing jobs to be executed by quantum computing resources in the computing environment 101 (e.g., by the quantum processor unit 103). The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by the programs 112. For instance, the server 108 or the computing environment 101 can expose the quantum machine instruction library to the access nodes 110 through a set of application programming interfaces (APIs). Accordingly, the programs 112 that are produced by the access nodes 110 and delivered to the server 108 may include information that invokes a quantum machine instruction library stored at the server 108. In some implementations, one or more of the access nodes 110 includes a local version of a quantum machine instruction library. Accordingly, the programs 112 that are produced by the access node 110B and delivered to the server 108 may include instruction sets from a quantum machine instruction library.

The example quantum processor unit 103 shown in FIG. 1 can perform quantum computational tasks by executing quantum machine instructions. In some implementations, the quantum processor unit 103 can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, the quantum processor unit 103 can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, the quantum processor unit 103 can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some instances, pairs of qubits can be addressed, for example, with two-qubit logic operations that are capable of generating entanglement, independent of other pairs of qubits. In some implementations, more than two qubits can be addressed, for example, with multi-qubit quantum logic operations capable of generating multi-qubit entanglement. In some implementations, the quantum processor unit 103 is constructed and operated according to a scalable quantum computing architecture. For example, in some cases, the architecture can be scaled to a large number of qubits to achieve large-scale general purpose coherent quantum computing.

The example quantum processor unit 103 shown in FIG. 1 includes controllers 106, signal hardware 104, and a quantum processor cell 102. A quantum processor unit may include additional or different features, and the components of a quantum processor unit may operate as described with respect to FIG. 1 or in another manner.

In some instances, all or part of the quantum processor cell 102 functions as a quantum processor, a quantum memory, or another type of subsystem. In some examples, the quantum processor cell 102 includes a quantum circuit system. The quantum circuit system may include qubit devices, resonator devices and possibly other devices that are used to store and process quantum information.

In some cases, the quantum processor cell 102 includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102. In some cases, the quantum processor cell 102 includes an ion trap system, and the qubit devices are implemented as trapped ions controlled by optical signals delivered to the quantum processor cell 102. In some cases, the quantum processor cell 102 includes a spin system, and the qubit devices are implemented as nuclear or electron spins controlled by microwave or radio-frequency signals delivered to the quantum processor cell 102. The quantum processor cell 102 may be implemented based on another physical modality of quantum computing.

In some implementations, the example quantum processor cell 102 can process quantum information by applying control signals to the qubits in the quantum processor cell 102. The control signals can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

The example signal hardware 104 includes components that communicate with the quantum processor cell 102. The signal hardware 104 may include, for example, waveform generators, amplifiers, digitizers, high-frequency sources, DC sources, AC sources and other types of components. The signal hardware may include additional or different features and components. In the example shown, components of the signal hardware 104 are adapted to interact with the quantum processor cell 102. For example, the signal hardware 104 can be configured to operate in a particular frequency range, configured to generate and process signals in a particular format, or the hardware may be adapted in another manner.

In some instances, one or more components of the signal hardware 104 generate control signals, for example, based on control information from the controllers 106. The control signals can be delivered to the quantum processor cell 102 to operate the quantum processor unit 103. For instance, the signal hardware 104 may generate signals to implement quantum logic operations, readout operations or other types of operations. As an example, the signal hardware 104 may include arbitrary waveform generators (AWGs) that generate electromagnetic waveforms (e.g., microwave or radio-frequency) or laser systems that generate optical waveforms. The waveforms or other types of signals generated by the signal hardware 104 can be delivered to devices in the quantum processor cell 102 to operate qubit devices, readout devices, bias devices, coupler devices or other types of components in the quantum processor cell 102.

In some instances, the signal hardware 104 receives and processes signals from the quantum processor cell 102. The received signals can be generated by operation of the quantum processor unit 103. For instance, the signal hardware 104 may receive signals from the devices in the quantum processor cell 102 in response to readout or other operations performed by the quantum processor cell 102. Signals received from the quantum processor cell 102 can be mixed, digitized, filtered, or otherwise processed by the signal hardware 104 to extract information, and the information extracted can be provided to the controllers 106 or handled in another manner. In some examples, the signal hardware 104 may include a digitizer that digitizes electromagnetic waveforms (e.g., microwave or radio-frequency) or optical signals, and a digitized waveform can be delivered to the controllers 106 or to other signal hardware components. In some instances, the controllers 106 process the information from the signal hardware 104 and provide feedback to the signal hardware 104; based on the feedback, the signal hardware 104 can in turn generate new control signals that are delivered to the quantum processor cell 102.

In some implementations, the signal hardware 104 includes signal delivery hardware that interface with the quantum processor cell 102. For example, the signal hardware 104 may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor cell 102. In some instances, signal delivery hardware performs preprocessing, signal conditioning or other operations on readout signals received from the quantum processor cell 102.

The example controllers 106 communicate with the signal hardware 104 to control operation of the quantum processor unit 103. The controllers 106 may include digital computing hardware that directly interfaces with components of the signal hardware 104. The example controllers 106 may include processors, memory, clocks and other types of systems or subsystems. The processors may include one or more single-core or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory, a digital or quantum memory, or another type of computer storage medium. The controllers 106 may include additional or different features and components.

In some implementations, the controllers 106 include memory or other components that store quantum state information, for example, based on qubit readout operations performed by the quantum processor unit 103. For instance, the states of one or more qubits in the quantum processor cell 102 can be measured by qubit readout operations, and the measured state information can be stored in a cache or other type of memory system in one or more of the controllers 106. In some cases, the measured state information is used in the execution of a quantum algorithm, a quantum error correction procedure, a quantum processor unit (QPU) calibration or testing procedure, or another type of quantum process.

In some implementations, the controllers 106 include memory or other components that store quantum machine instructions, for example, representing a quantum program for execution by the quantum processor unit 103. In some cases, the quantum machine instructions are received from the server 108 in a hardware-independent format. For example, quantum machine instructions may be provided in a quantum instruction language such as Quil, described in the publication "A Practical Quantum Instruction Set Architecture," arXiv:1608.03355v2, dated Feb. 17, 2017, or another quantum instruction language. For instance, the quantum machine instructions may be written in a format that can be executed by broad range of quantum processor units or quantum virtual machines.

In some instances, the controllers 106 can interpret the quantum machine instructions and generate hardware-specific control sequences configured to execute the operations proscribed by the quantum machine instructions. For example, the controllers 106 may generate control information that is delivered to the signal hardware 104 and converted to control signals that control the quantum processor cell 102.

In some implementations, the controllers 106 include one or more clocks that control the timing of operations. For example, operations performed by the controllers 106 may be scheduled for execution over a series of clock cycles, and clock signals from one or more clocks can be used to control the relative timing of each operation or groups of operations. In some cases, the controllers 106 schedule control operations according to quantum machine instructions in a quantum computing program, and the control information is delivered to the signal hardware 104 according to the schedule in response to clock signals from a clock or other timing system.

In some implementations, the controllers 106 include processors or other components that execute computer program instructions (e.g., instructions formatted as software, firmware, or otherwise). For example, the controllers 106 may execute a quantum processor unit (QPU) driver software, which may include machine code compiled from any type of programming language (e.g., Python, C++, etc.) or instructions in another format. In some cases, QPU driver software receives quantum machine instructions (e.g., based on information from the server 108) and quantum state information (e.g., based on information from the signal hardware 104), and generates control sequences for the quantum processor unit 103 based on the quantum machine instructions and quantum state information.

In some instances, the controllers 106 generate control information (e.g., a digital waveform) that is delivered to the signal hardware 104 and converted to control signals (e.g., analog waveforms) for delivery to the quantum processor cell 102. The digital control information can be generated based on quantum machine instructions, for example, to execute quantum logic operations, readout operations, or other types of control.

In some instances, the controllers 106 extract qubit state information from qubit readout signals, for example, to identify the quantum states of qubits in the quantum processor cell 102 or for other purposes. For example, the controllers may receive the qubit readout signals (e.g., in the form of analog waveforms) from the signal hardware 104, digitize the qubit readout signals, and extract qubit state information from the digitized signals.

In the example shown in FIG. 1, the computing environment 101 can utilize multiple quantum processor unit (QPU) instances to execute a quantum algorithm or other quantum computation. Each QPU instance can include a mapping of the quantum algorithm onto a quantum computation resource in the computing environment 101. As shown in the examples in FIGS. 3A, 3B, 4A, 4B, 4C, 4D, and 5, each distinct QPU instance is distinguishable from the other distinct QPU instances; for example, each QPU instance can be a distinct collection of physical components (e.g., qubit devices), a distinct allocation of algorithmic assignments to a (fixed or unfixed) collection of components (e.g. components), a distinct collection of calibrated operational parameters (e.g. gate pulse amplitudes), or a distinct collection of a combination of these and other attributes.

In some cases, the server 108 can identify multiple distinct QPU instances on one or more QPUs in the computing environment 101, or the controllers 106 can identify multiple distinct QPU instances on the QPU 103 shown in FIG. 1; and a classical computing resource (e.g., the controllers 106, the server 108 or the other computing resources 107) can evaluate results from the multitude of QPU instances to identify an output of the quantum algorithm. Such techniques may be deployed using a hybrid classical-quantum description, and a hybrid compiler can be used to control interactions between the classical computing components and QPU instances.

In some implementations of a hybrid classical-quantum deployment, a classical co-processor runs a single classical function call over results from a multitude of QPU instances, such as, for example, computing an evaluation function (e.g., maximum, minimum, mean, mode, etc.) over results from the respective QPU instances. In some cases, the output of the quantum computation can be selected according to one or more evaluation criteria for the quantum computation, for example, as the minimum result from all QPU instances, the average result from all QPU instances, the most frequent result from all QPU instances (e.g., with some specified precision), etc. Conditional logic may also be used, for example, try-until-success statements, machine learning or classical pattern recognition over QPU instance results. In some cases, post-selection may be applied to the results from the QPU instances. For example, if a program is sampling a problem where all valid outcomes are known to satisfy some constraints, outcomes that violate one or more constraints can be discarded.

The use of multiple QPU instances and the optional hybrid classical-quantum functionality may be exposed to access nodes 110 or it may be hidden from access nodes 110. For instance, when the functionality is exposed, an access node 110 could instruct the hybrid compiler to take the minimum execution result from multiple QPU instances, and the access node 110 could potentially specify the number or type of QPU instances to instantiate. These instances could, for example, be executed in parallel. Or a hybrid compiler executed at the server 108 or controllers 106 could otherwise implement a routine with known evaluation criteria, and the access nodes 110 may or may not be aware of QPU instances being utilized to achieve the final output.

In some implementations, the computing environment 101 can achieve an efficient interaction between classical and quantum computational resources so that sufficient QPU instances are called (but no more than necessary) to achieve a desired accuracy or certainty in the output. This could be implemented, for example, by allowing a termination condition to be specified at the time of compilation of the program implementing the classical result aggregation algorithm. For example, the hybrid algorithms may be deployed through a shared memory specification in a quantum instruction language, for example, in the quantum instruction language known as Quil (described in the publication "A Practical Quantum Instruction Set Architecture," arXiv: 1608.03355v2, dated Feb. 17, 2017).

Figure 2:
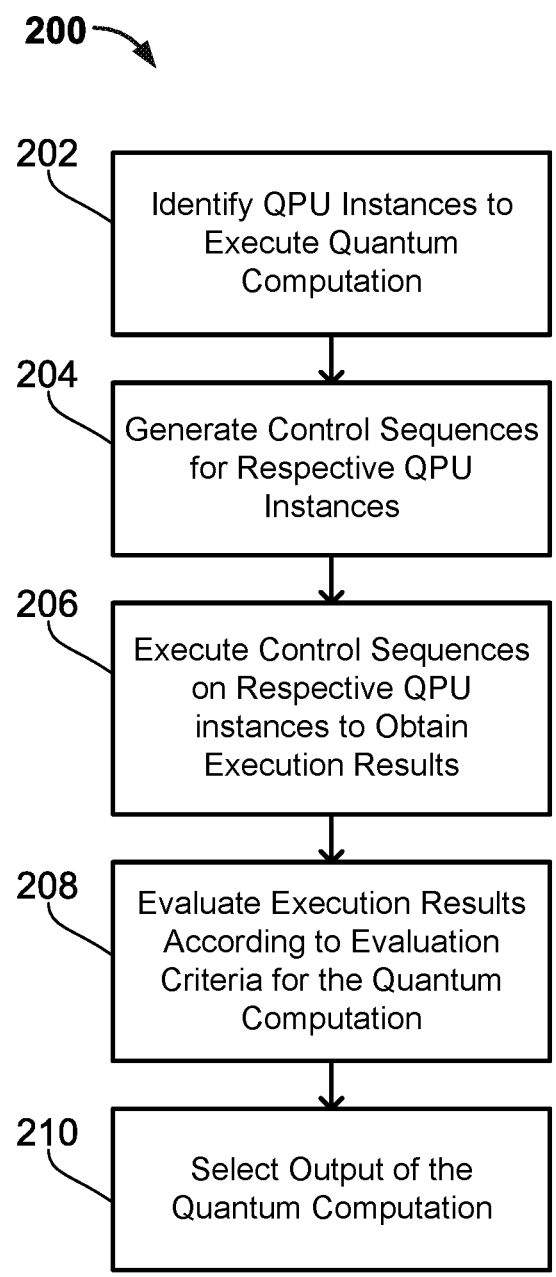
FIG. 2 is a flow chart showing an example quantum computing process.

FIG. 2 is a flow chart showing an example quantum computing process 200. Operations in the example process 200 may be performed by a quantum processor unit (e.g., the QPU 103 in FIG. 1) or by another computer system or subsystem (e.g., the server 108 in FIG. 1) in a computer system. For instance, the process 200 may be performed by a control system (e.g., the controller 106 in FIG. 1) or another component of a QPU or by a host system that provides computing jobs to the QPU.

In the example process 200 shown in FIG. 2, some of the operations are performed by classical computing resources (e.g., a digital microprocessor) and others are performed by quantum computing resources (e.g., a quantum processor). For example, in some implementations, all or part of operation 206 is performed by a quantum processor unit, and all other operations are performed by a classical co-processor. For example, in the example computing environment 101 shown in FIG. 1, executing the operation 206 in FIG. 2 may include storing and processing information in the quantum processor cell 102 (which may be controlled, for example, by the controllers 106), while other operations (202, 204, 208, 210) in FIG. 2 may be executed by a classical processor (e.g., in the controllers 106, the server 108 or the additional computing resources 107). In some cases, the process 200 can be executed by other types of hardware.

The example process 200 may include additional or different operations, and the operations may be performed in the order shown or in another order. In some cases, one or more of the operations shown in FIG. 2 are implemented as processes that include multiple operations, sub-processes or other types of routines. In some cases, operations can be combined, performed in another order, performed in parallel, iterated, or otherwise repeated or performed another manner.

At 202, quantum processor unit (QPU) instances in a quantum computing system are identified to execute a quantum computation. The QPU instances can be identified, for example, by a classical co-processor or another type of controller in a QPU system or in a computing environment that includes a QPU system. For instance, one or more of the controllers 106 in FIG. 1 or the server 108 in FIG. 1 may identify QPU instances that are defined over the quantum processor cell 102 in the QPU 103 or in one or more other quantum processor cells in the other computing resources 107.

Figure 5:
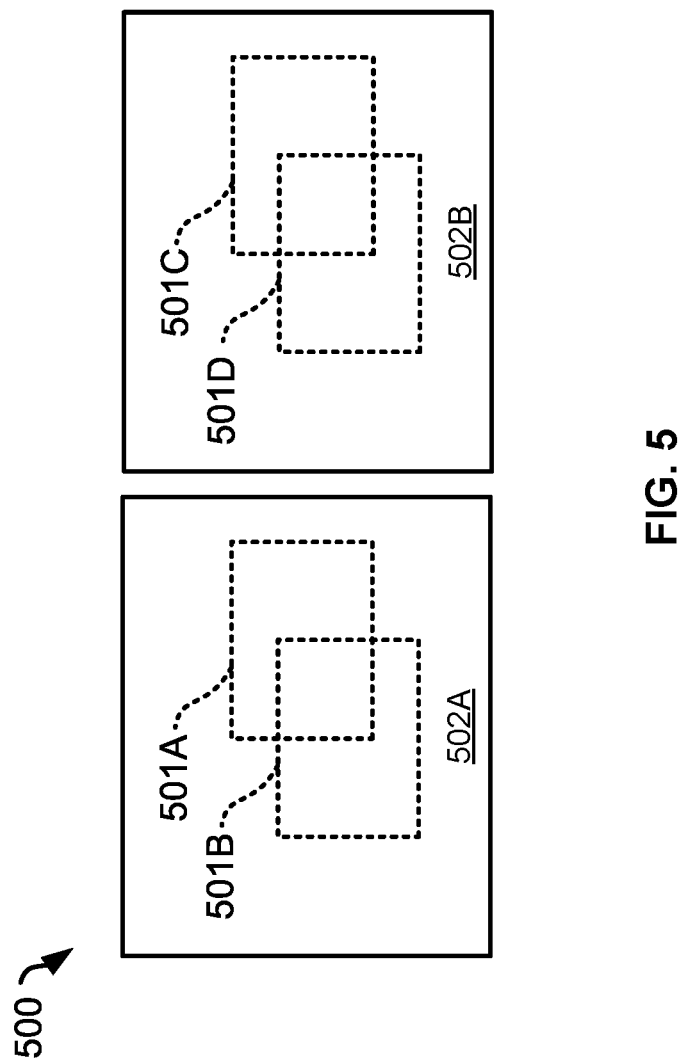
FIG. 5 is a diagram showing four distinct quantum processor unit (QPU) instances in an example quantum computing system.

In some implementations, all QPU instances are defined over an individual quantum processor cell (e.g., as shown in FIGS. 3A, 3B, 4A, 4B, 4C, 4D), or multiple QPU instances can be defined over multiple quantum processor cells (e.g., as shown in FIG. 5). Each QPU instance can include an assignment of quantum information (e.g., qubits) defined in the quantum computation to quantum information processing resources (e.g., qubit devices) available to execute the quantum computation. For example, each QPU instance may assign the N qubits in an N-qubit quantum algorithm to a set of N qubit devices in a quantum processor.

In some cases, the QPU instances are identified according to a prescription provided in a program, for example, in one of the programs 112 received from an access node 110. In some cases, the QPU instances are identified independent of such programs. For example, the QPU instances may be identified by a process that is executed entirely by the quantum processor system (e.g., by a co-processor in the QPU 103 in FIG. 1) and not exposed outside the quantum processor system.

In the example shown in FIG. 2, the QPU instances can be identified according to an identification process, for example, a subprogram that is executed by a hybrid classical-quantum driver. The identification process can identify the QPU instances, for example, by selecting attributes of each QPU instance. The attributes may include, for example, the collection of physical components (e.g., qubit devices) included in the QPU instance, the algorithmic assignments to the collection of components (e.g., assignment of logical qubits to physical qubit devices) in the QPU instance, the calibrated operational parameters (e.g., gate pulse amplitudes) used to perform quantum logic operations in the QPU instance, or a combination of these and other attributes.

In some examples, identifying the distinct QPU instances includes selecting an attribute of each distinct QPU instance by a random selection process. For example, N qubit devices for each QPU instance may be randomly selected from the M qubit devices available in one or more quantum processor cells (where M>N, or where M>>N in some cases). As an example, the four qubits in each of the example QPU instances 401A, 401B, 401C, 401D shown in FIGS. 4A, 4B, 4C, 4D respectively may be randomly selected from the six qubits in the quantum processor cell 400. In some implementations, a seeded random number generator can be used to pseudo-randomly select attributes of the QPU instances, for example, so that the selection can be duplicated if necessary. The attributes of QPU instances that have been identified can be saved (e.g., to a database), and the saved attribute data can be used, for example, to avoid duplicating QPU instances, or to retrieve attributes of prior QPU instances.

In some examples, identifying the distinct QPU instances includes selecting an attribute of each distinct QPU instance based on a physical layout of the qubit devices in the quantum processor cell. For example, the qubit devices may be selected for each QPU instance in a manner that ensures each qubit device in the QPU instance is adjacent to a minimum number (e.g., 1, 2, 3, 4, 5, etc.) of other qubit devices in the QPU instance. In the example shown in FIGS. 4A-4D, each qubit device in each QPU instance is directly connected to at least one other qubit device in the same QPU instance. As another example, each QPU instance may be selected to ensure that no two QPU instances share any dedicated hardware resources (e.g., no two QPU instances require the same qubit device), to allow the two QPU instances to operate in parallel. For example, the QPU instances shown in FIG. 3A include mutually exclusive sets of qubit devices, so that all three QPU instances can operate in parallel.

In some implementations, QPU instances can be identified such that the locality of each QPU instance is maximized, for example, to allow multiple QPU instances to run on a single physical QPU without conflict. If multiple QPU instances are instantiated by a compiler, the compiler may check (e.g., at compile time) for available resources on the physical QPU. For example, the compiler may check for hardware resources spaced as far apart across the chip as possible, to minimize cross talk between QPU instances. In some cases, the compiler may subdivide the available resources into such QPU instances without conflict.

In some examples, identifying the distinct QPU instances includes selecting an attribute of each distinct QPU instance based partially on a performance heuristic associated with at least one of the qubit devices in the set, in addition to other factors (e.g., physical layout, random selection, etc.). As an example, minimum coherence times or gate fidelities may be used to define an initial pool of QPU resources from which to randomly select the specific attributes of each QPU instance. In some cases, the distinct QPU instances are selected independent of any performance heuristic. For instance, heuristics may be intentionally disregarded in the selection of QPU instances.

At 204, control sequences are generated for the respective QPU instances. In this example, each control sequence is a distinct control sequence, for example, which includes a distinct set of control signals to be delivered to the quantum processor cell(s) that house the resources of the respective QPU instance. In this example, all the control sequences are nominally configured to execute the same quantum computation, namely, the quantum computation that was the basis for identifying the QPU instances at 202. The control sequences may be generated, for example, by the controllers or signal hardware (or both) in a QPU system.

In some implementations, each QPU instance includes one or more qubit devices in a superconducting microwave integrated quantum circuit. For example, the qubit devices can be SQUID-based devices or other types of circuit devices containing Josephson junctions (e.g., transmon qubit devices, fluxonium qubit devices, starmon qubit devices, Xmon qubit devices, gmon qubit devices, etc.). In such cases, the control sequences may include a series of control signals that can be delivered to the superconducting microwave integrated quantum circuit to interact with the qubit devices, coupler devices, readout devices, etc. For instance, microwave signals tuned to an operating frequency of a qubit device or a coupler device, or bias signals that tune such operating frequencies, may be used to perform quantum logic gates or other types of operations.

At 206, the control sequences are executed on the respective QPU instances to obtain execution results. Delivering one of the control sequences to the quantum processor cell may cause the quantum computation to be executed on the QPU instance. The distinct quantum resources of each QPU instance will generally affect the execution results produced by that QPU instance. Although all of the control sequences may be nominally configured to execute the same quantum computation, a unique distribution of noise processes may affect each respective execution, for example, due to the unique physical attributes of the QPU instance. Thus, each of the control sequences may produce a different execution result, and therefore a set of distinct execution results is generated by executing the quantum computation on the distinct QPU instances. In some cases, two or more QPU instances may produce identical results.

In some implementations, multiple control sequences are executed in parallel on two or more of the distinct QPUs. For example, the quantum computation may be executed in parallel on all three of the example QPU instances 301A, 301B, 301C shown in FIG. 3A. However, in some cases, two or more of the control sequences are executed in series, for example, when multiple QPU instances require the same hardware resources or in other circumstances.

At 208, the execution results are evaluated according to evaluation criteria for the quantum computation. The execution results may be evaluated, for example, by a classical co-processor in the computing environment. The evaluation criteria can be a single criterion in some cases. For example, the evaluation criterion may select the maximum, minimum, mean, or mode of the execution results. In some cases, multiple criteria are used. For example, post-selection criteria may be applied before selecting the maximum, minimum, mean, or mode.

The evaluation criteria that are used to evaluate the execution results are based on the quantum computation. For example, if the quantum computation is a minimization or maximization algorithm, then the evaluation criteria may select the minimum value or maximum value of the execution results, as appropriate. As another example, if the quantum computation is a factoring algorithm, then the integers in each execution result can be evaluated (e.g., multiplied) to determine whether they are prime factors of the input value that was to be factored. As another example, if a quantum algorithm is sampling a problem where all valid outcomes are known to satisfy some constraints, execution results that violate one or more constraints can be discarded. As another example, the mode of the execution results ("majority vote") can be identified, for instance, by generating a histogram representation of the execution results. Other types of evaluation criteria may be used.

At 210, an output of the quantum computation is selected. In some cases, one of the execution results can be selected as an output of the quantum computation according to the evaluation criterion used at 208. For example, the output of the quantum computation can be the minimum result from all execution results, the most frequent result from all execution results, etc. In some cases, the output can be based on averaging or otherwise combining multiple execution results.

Figure 3A:
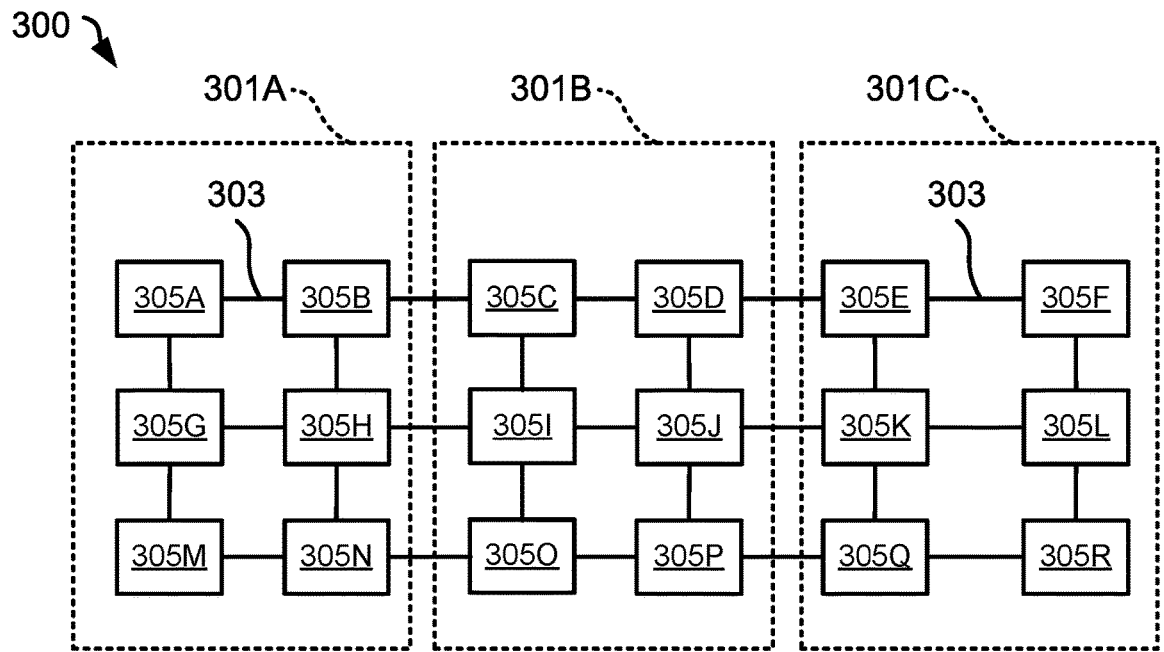
FIG. 3A is a diagram showing a set of three distinct quantum processor unit (QPU) instances in an example quantum processor cell.
Figure 3B:
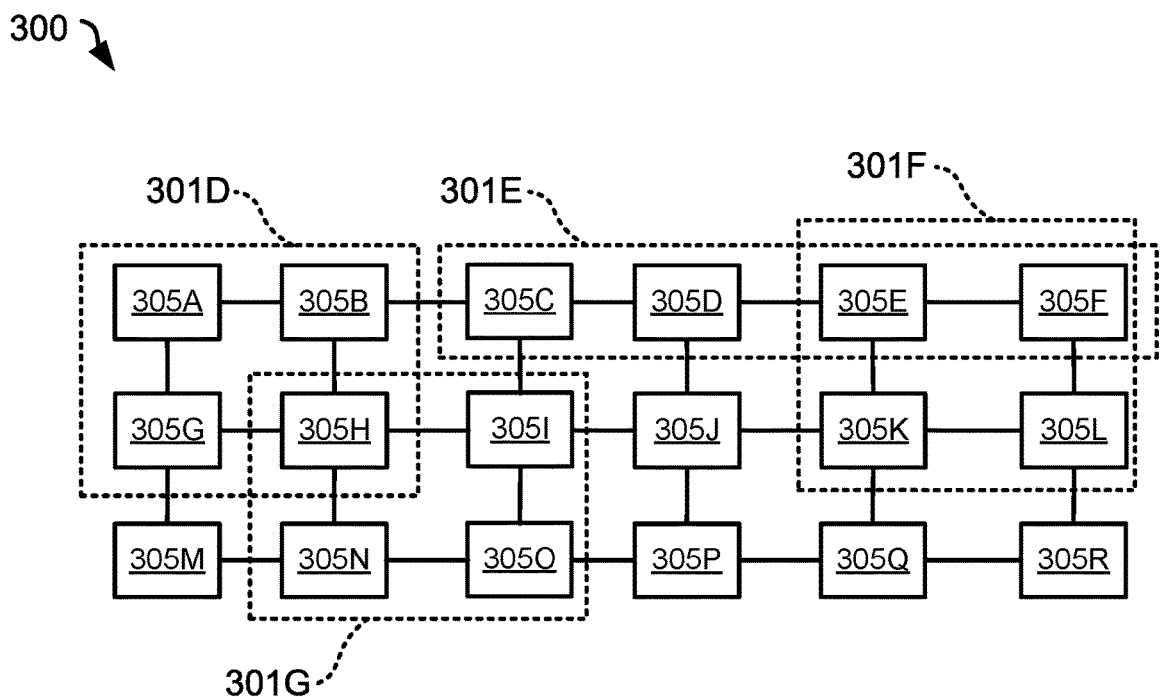
FIG. 3B is a diagram showing a set of four distinct quantum processor unit (QPU) instances in an example quantum processor cell.

FIG. 3A is a diagram showing a set of three distinct quantum processor unit (QPU) instances 301A, 301B, 301C in a quantum processor cell 300. FIG. 3B is a diagram showing a set of four distinct QPU instances 301D, 301E, 301F, 301G in the quantum processor cell 300. The quantum processor cell 300 may be deployed, for example, as the quantum processor cell 102 shown in FIG. 1, or the quantum processor cell 300 may be deployed in another type of computing environment. The example quantum processor cell 300 includes a rectilinear array of qubit devices 305A, 305B, 305C, 305D, 305E, 305F, 305G, 305H, 305I, 305J, 305K, 305L, 305M, 305N, 305O, 305P, 305Q, 305R (referred to generically as qubit devices 305), with neighboring pairs of the qubit devices 305 directly coupled to each other by connections 303. Although eighteen qubit devices are shown in FIG. 3A, the quantum processor cell 300 may include many more qubit devices. For instance, the rectilinear array may extend further in one or two dimensions of the planar array shown in FIGS. 3A and 3B, or the rectilinear array may extend to additional layers in a third dimension (e.g., out of the page).

As shown in FIG. 3A, each of the distinct QPU instances 301A, 301B, 301C includes a respective subset of the qubit devices 305, where each respective subset is selected from the superset of all qubit devices 305 in the quantum processor cell 300. In this example, each QPU instance includes six qubit devices. The first QPU instance 301A includes qubit devices 305A, 305B, 305G, 305H, 305M, 305N; the second QPU instance 301B includes qubit devices 305C, 305D, 305I, 305J, 305O, 305P; the third QPU instance 301C includes qubit devices 305E, 305F, 305K, 305L, 305Q, 305R.

The distinct QPU instances 301A, 301B, 301C shown in FIG. 3A may be identified by an identification process that selects mutually exclusive subsets of the qubit devices 305 for each of the distinct QPU instances, which may allow the same quantum computation to be executed on the set of QPU instances in parallel 301A, 301B, 301C. In cases where no two QPU instances require a common qubit device or other dedicated hardware resource, the QPU instances can execute quantum algorithms in parallel, for example, concurrently or otherwise.

The distinct QPU instances 301A, 301B, 301C shown in FIG. 3A may be identified by an identification process that selects an attribute of each distinct QPU instance (e.g., the combination of qubit devices in the QPU instance, or another attribute of the QPU instance) based on a physical layout of the qubit devices 305 in the quantum processor cell 300. The identification process may utilize information about the physical connectivity of qubit devices, coupler devices, readout devices, or other components of the quantum processor cell 300. For example, the identification process may require that all qubit devices in each QPU instance is directly connected to some minimum number (e.g., 1, 2, 3, 4, 5, etc.) of other qubit devices in the same QPU instance. The identification process may utilize information about the physical resources required to operate components of the quantum processor cell 300 allocated to a QPU instance. For example, the identification process may require that no individual qubit device is allocated to, or otherwise needed for operation of, more than one QPU instance.

As shown in FIG. 3B, each of the distinct QPU instances 301D, 301E, 301F, 301G includes a respective subset of the qubit devices 305, where each respective subset is selected from the superset of all qubit devices 305 in the quantum processor cell 300. In this example, each QPU instance includes four qubit devices. The first QPU instance 301D includes qubit devices 305A, 305B, 305G, 305H; the second QPU instance 301E includes qubit devices 305C, 305D, 305E, 305F; the third QPU instance 301F includes qubit devices 305E, 305F, 305K, 305L; and the fourth QPU instance 301G includes qubit devices 305H, 305I, 305N, 305O.

The distinct QPU instances 301D, 301E, 301F, 301G shown in FIG. 3B may be identified by an identification process that selects overlapping (partially overlapping or fully overlapping) subsets of the qubit devices 305 for at least some of the distinct QPU instances, so that at least one qubit device is included in two or more of the distinct QPU instances. For instance, the first QPU instance 301D and the fourth QPU instance 301G share the qubit device 305H; similarly, the second QPU instance 301E and the third QPU instance 301F share the qubit devices 305E, 305F.

The example QPU instances shown in FIGS. 3A and 3B may be identified by another type of identification process. For example, an identification process may select one or more attributes of each distinct QPU instance (e.g., the combination of qubit devices in the QPU instance, or another attribute of the QPU instance) based partially on a physical layout of the qubit devices in the quantum processor cell 300, based partially on a random selection process, based partially on a performance heuristic (e.g., gate or process fidelities, coherence times, etc.) associated with at least one of the qubit devices in the set, or a combination of these and other factors.

FIGS. 4A, 4B, 4C, and 4D are diagrams collectively showing four distinct quantum processor unit (QPU) instances in a quantum processor cell 400. The quantum processor cell 400 may be deployed, for example, as the quantum processor cell 102 shown in FIG. 1, or the quantum processor cell 400 may be deployed in another type of computing environment. The example quantum processor cell 400 includes a rectilinear array of qubit devices 405A, 405B, 405C, 405D, 405E, 405F (referred to generically as qubit devices 405), with neighboring pairs of the qubit devices 405 directly coupled to each other by connections 403. Although six qubit devices are shown in FIGS. 4A-4D, the quantum processor cell 400 may include many more qubit devices.

In the example shown in FIGS. 4A-4D, the four QPU instances 401A, 401B, 401C, 401D are identified to execute a quantum computation that is defined for a set of four qubits (e.g., a four-qubit quantum algorithm). The four qubits defined in the quantum computation are labeled $Q_1$, $Q_2$, $Q_3$, $Q_4$, respectively. Each of the QPU instances 401A, 401B, 401C, 401D includes a distinct assignment of the four qubits in the quantum algorithm to qubit devices in the quantum processor cell 400.

The first QPU instance 401A and the second QPU instance 401B are each defined over the same set of qubit devices 405C, 405D, 405E, 405F. The first QPU instance 401A includes a first assignment of the set of four qubits to the qubit devices 405C, 405D, 405E, 405F (assigned $Q_1$, $Q_3$, $Q_2$, $Q_4$, respectively), and the second QPU instance 401B includes a second distinct assignment of the set of four qubits to the same qubit devices 405C, 405D, 405E, 405F (assigned $Q_4$, $Q_1$, $Q_2$, $Q_3$, respectively).

The third QPU instance 401C and the fourth QPU instance 401D are defined over distinct sets of qubit devices, with two of the qubit devices 405A, 405B shared by the two sets. The third QPU instance 401C is defined over the qubit devices 405A, 405B, 405C, 405D, and the fourth QPU instance 401D is defined over the qubit devices 405A, 405B, 405E, 405F. The third QPU instance 401C and the fourth QPU instance 401D have distinct qubit assignments for the two shared qubit devices 405A, 405B. In particular, the third QPU instance 401C assigns qubits $Q_1$, $Q_3$, $Q_2$, $Q_4$, to the qubit devices 405A, 405B, 405C, 405D respectively; and the fourth QPU instance 401D assigns qubits $Q_4$, $Q_1$, $Q_2$, $Q_3$, to the qubit devices 405A, 405B, 405E, 405F respectively.

FIG. 5 is a diagram showing four distinct quantum processor unit (QPU) instances in a quantum computing system 500 that includes two quantum processor cells 502A, 502B. One or both of the quantum processor cells 502A, 502B may be deployed, for example, as the quantum processor cell 102 shown in FIG. 1. For instance, the quantum processor unit 103 in FIG. 1 may be modified to include two quantum processor cells; or the quantum processor unit 103 in FIG. 1 may include the first quantum processor cell 502A, and one of the other computing resources 107 can be another quantum processor unit that includes the second quantum processor cell 502B. In some implementations, the quantum processor cells 502A, 502B may be deployed in another type of computing environment.

As shown in FIG. 5, the four QPU instances 501A, 501B, 501C, 501D are identified to execute a quantum computation that is defined for a set of N qubits (e.g., an N-qubit quantum algorithm). Each of the QPU instances 501A, 501B, 501C, 501D includes a distinct assignment of the N qubits in the quantum algorithm to qubit devices in the quantum processor cells 502A, 502B. In some cases, a single QPU instance may include qubit devices in multiple quantum processor cells, or each QPU instance may include qubit devices in a single quantum processor cell. In the example shown in FIG. 5, the first and second QPU instances 501A, 501B assign the set of N qubits to respective first and second sets of qubit devices in the first quantum processor cell 502A; and the third and fourth QPU instances 501C, 501D assign the set of N qubits to respective third and fourth sets of qubit devices in the second quantum processor cell 502B.

Figure 6A:
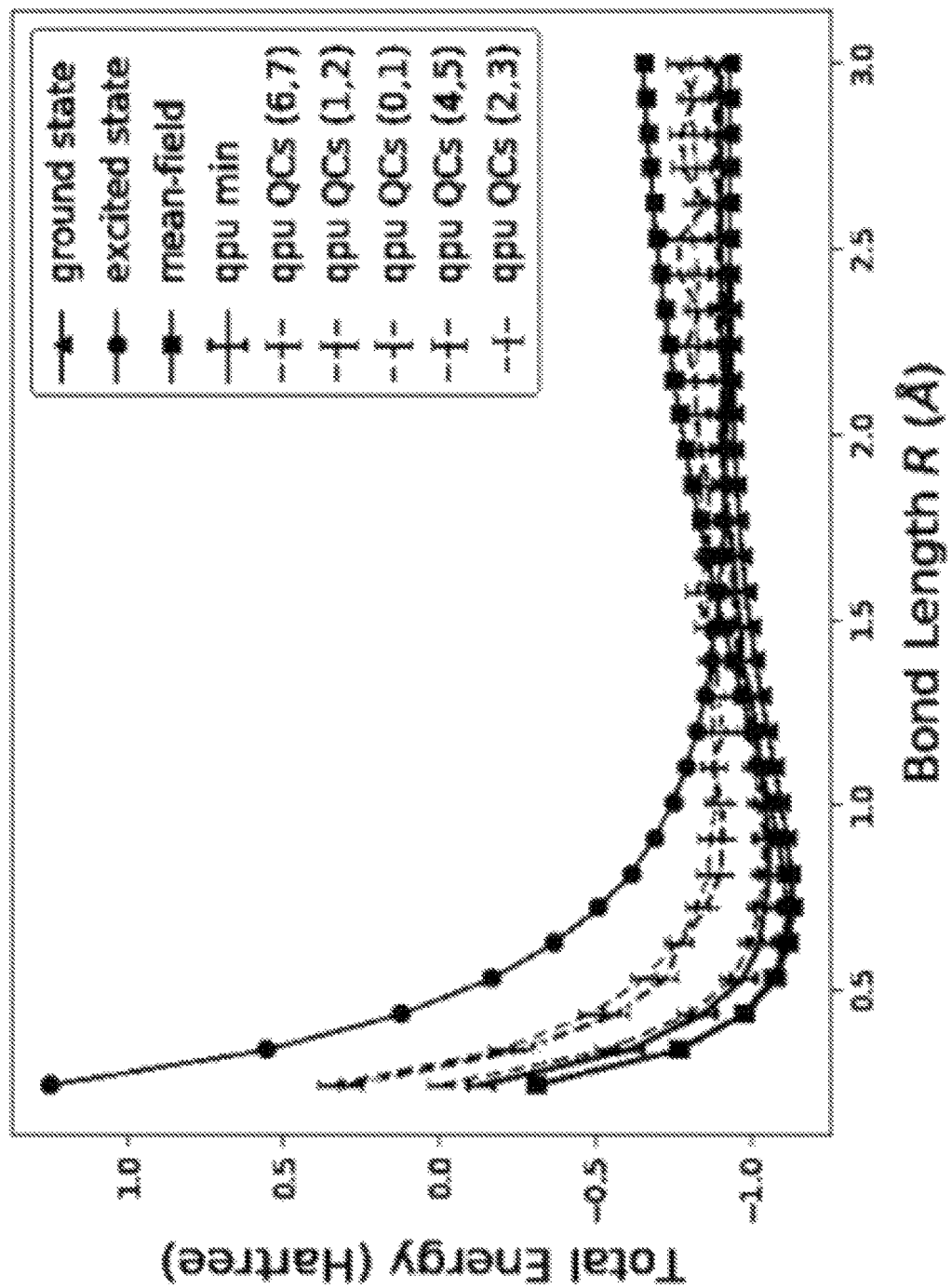
FIGS. 6A and 6B are plots showing data from an example quantum computation executed on multiple distinct quantum processor unit (QPU) instances.
Figure 6B:
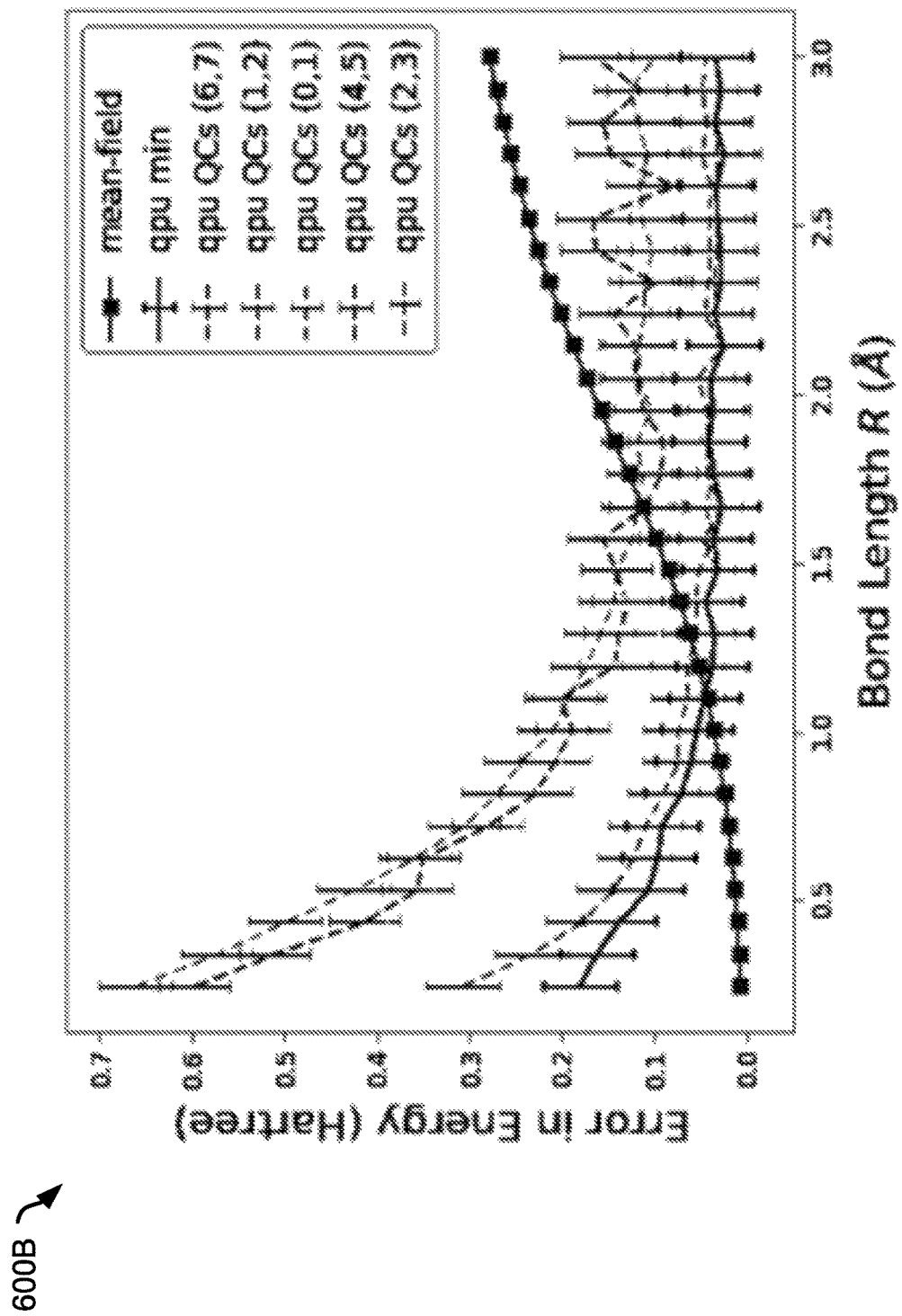

FIGS. 6A and 6B are plots 600A, 600B showing data from an example quantum computation executed on multiple distinct quantum processor unit (QPU) instances. In the example shown, a proprietary 8-qubit quantum processor of Rigetti Computing was used to calculate the ground state energy of molecular hydrogen ($H_2$). This calculation proceeds by varying a parameter of interest (in this case, the chemical bond length) in order to find the energetically favorable molecular configuration. By running the calculation on multiple parts of the 8-qubit quantum processor, the calculation is made more robust against circuit imperfections, as the quantum variational principle guarantees that the minimum of all the curves obtained is a valid estimate of the energy (regardless of which points were run on which parts of the quantum processor).

In the example shown in FIGS. 6A and 6B, each QPU instance includes two qubits of the 8-qubit quantum processor, and each QPU instance includes the two qubits of the quantum algorithm mapped to a distinct pair of qubits. The legends in the figures shows the physical qubit labels in each QPU instance, and the order of the qubit labels indicates the mapping to qubits in the quantum algorithm. The QPU instances map the first and second qubits respectively to physical qubits (6, 7), (1, 2), (0, 1), (4, 5), and (2, 3). Generally, in FIGS. 6A and 6B the order of the curves, from the maximum values generated by the QPU to the minimum values generated by QPU, is: (0,1); (4,5); (2,3); (1,2); (6,7). The "qpu min" plot overlays the (6,7) plot, with the exception of one point data point where another QPU instance found a better min value. The plot 600A in FIG. 6A shows the total energy (in Hartree energy units) as a function of bond length (in units of Angstrom, Å). The plot 600B in FIG. 6B shows the error in energy (in Hartree energy units) as a function of bond length (in units of Angstrom, Å).

In this example, the minimum of the execution results from all QPU instances is selected as the output of the quantum computation. In the context of a hybrid classical-quantum deployment, the classical MIN( ) function computed over five samples of execution results for each bond length provides the output. The hybrid compiler, in this case, executes two commands serially. First, the nominally same quantum algorithm (calculate the ground state energy of molecular hydrogen, $H_2$) is executed over the five QPU instances for each bond length. Then, a classical resource computes the MIN( ) function after the results are collected. The final answer is more accurate than any individual QPU instance result.

As is evident in the results shown in the plots 600A, 600B, the output on the calculations that ran on the QPU approach the true ground state (minimum energy state) of the $H_2$ molecule and are better than mean-field predictions for this system. The mean-field predictions represent the standard conventional technique to estimate these energies.

Figure 7:
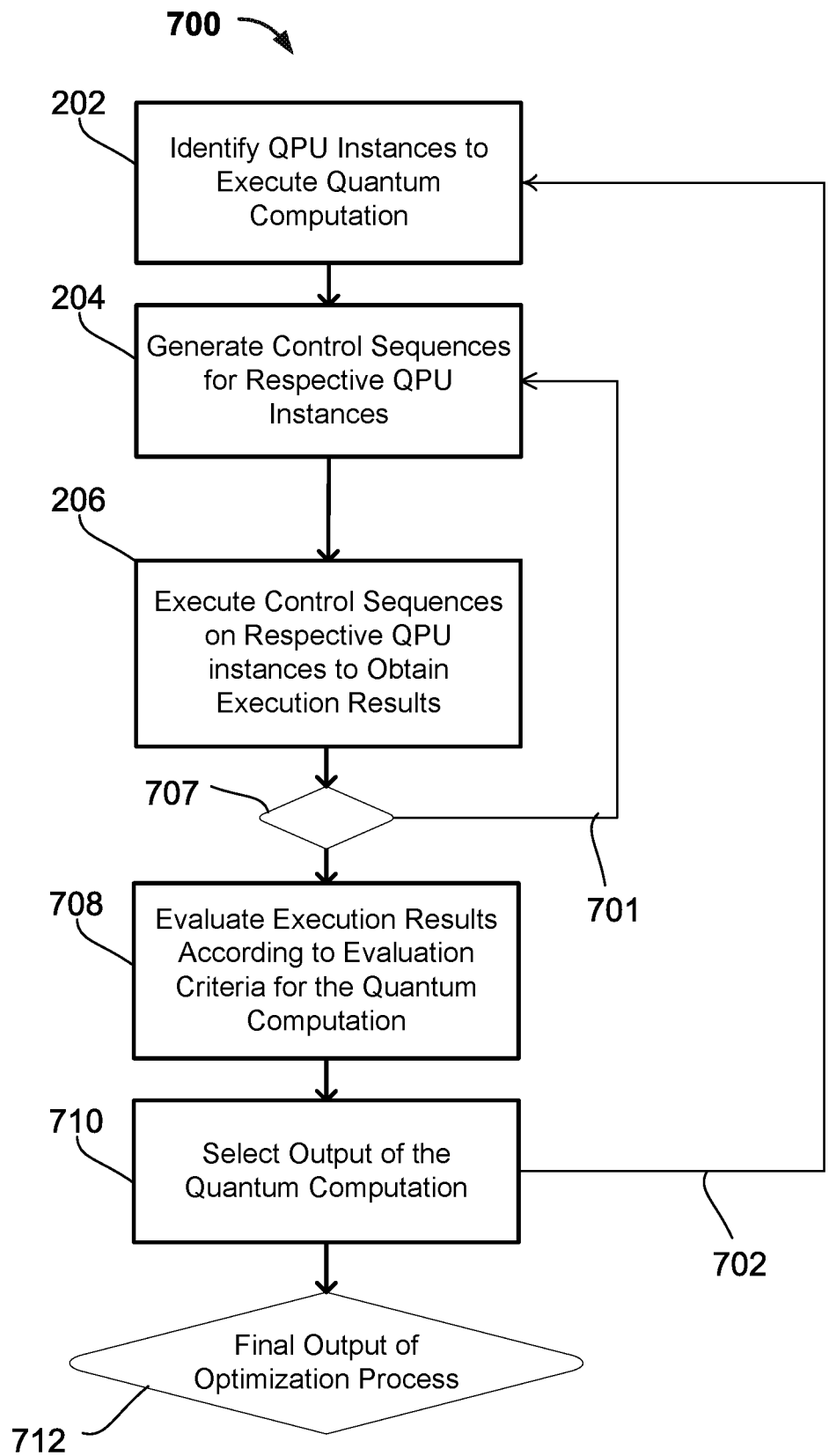
FIG. 7 is a flow chart showing an example quantum computing process with nested optimization.

Furthermore, in some embodiments the process 200 may be extended to include iterations for deriving (1) an optimum within each instance, and (2) an optimum of instances. An example of such a nested optimization process 700 is shown in FIG. 7, where iteration 701 provides an optimization within each instance, and iteration 702 provides an optimization over instances, and the result is output 712. Iteration 701 repeats the execution of the same control sequences on the respective QPU instances to obtain multiple execution results for each instance; at 707 the number of iterations is controlled—the number of iterations may be preset or may be determined by an objective function. As an example, an objective function may be the estimation of the ground state energy of a molecule using QVE, in which case the MINIMUM value represents the most optimum estimation for each execution. After completion of the iterations the execution results for the quantum computation may be evaluated at 708 according to criteria as described above for 208 (except there are now multiple results for each instance), followed by selection of an output for the quantum computation at 710 according to criteria described above for 210 (except there are now multiple results for each instance); final output of the optimization process is provided at 712. Alternatively, the evaluation at 708 and selection at 710 may be used to select which instances should be used to produce the most useful results, based on criteria that evaluate the reliability; the selected instances may then be run through iteration 701 followed by evaluation at 708 and selection at 710 followed by final output of the selected output at 712, all as described above. The process in the proceeding sentence may further be automated by computing a similar or identical objective function (e.g. the algorithm accuracy metric) over all instance results and using an optimizer over the instance-generating process to find the optimum instance. Examples of criteria for evaluating the reliability include: the statistical properties (e.g. variance) of some heuristic quantities (e.g. two qubit (2Q) gate fidelity), and the statistical properties (e.g. variance) of the algorithm output; for either case minimizing variance may be useful to consider in addition to the mean performance. One or more of steps 701, 702, 707, 708, 710 and 712 may in embodiments be run on one or more classical processors.

Some of the subject matter and operations described in this specification can be implemented in digital electronic circuitry or quantum processor circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a classical computer, a quantum computer, a hybrid quantum/classical computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit), quantum information processing circuitry, or other types of systems.

Processors suitable for the execution of a computer program include, by way of example, both general and special purpose microprocessors, quantum information processors, and processors of any kind of digital or quantum computer. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device. Devices suitable for storing computer program instructions and data include all forms of non-volatile memory, media and memory devices, including by way of example quantum memory systems, semiconductor memory devices (e.g., EPROM, EEPROM, flash memory devices, and others), etc. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending data to and receiving data from a device that is used by the user; for example, by exchanging network packets with the device.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

The invention claimed is:

1. A computing method comprising:
identifying a plurality of distinct quantum processor unit (QPU) instances in a quantum computing system, each of the distinct QPU instances identified to execute a quantum computation;

obtaining a set of execution results by executing the quantum computation on the plurality of distinct QPU instances, each execution result being obtained by executing the quantum computation on a respective one of the distinct QPU instances; and selecting one of the execution results as an output of the quantum computation according to an evaluation criterion for the quantum computation.

2. The quantum computing method of claim 1, wherein identifying the plurality of distinct QPU instances comprises selecting an attribute of each distinct QPU instance by a random selection process.

3. The quantum computing method of claim 1, wherein each of the distinct QPU instances includes a respective set of qubit devices selected from a plurality of qubit devices in a quantum processor cell, and identifying the plurality of distinct QPU instances comprises selecting an attribute of each distinct QPU instance based on a physical layout of the qubit devices in the quantum processor cell.

4. The quantum computing method of claim 1, wherein identifying the plurality of distinct QPU instances comprises selecting mutually exclusive sets of qubit devices for the distinct QPU instances, to allow the quantum computation to be executed on the plurality of distinct QPU instances in parallel.

5. The quantum computing method of claim 1, wherein each of the distinct QPU instances includes a respective set of qubit devices, and identifying the plurality of distinct QPU instances comprises selecting the set of qubit devices for each distinct QPU instance based on a performance heuristic associated with at least one of the qubit devices in the set.

6. The quantum computing method of claim 1, wherein each of the distinct QPU instances includes a respective set of qubit devices, and at least one qubit device is included in two or more of the distinct QPU instances.

7. The quantum computing method of claim 1, wherein the quantum computation is defined for a set of qubits, and the plurality of distinct QPU instances includes:
a first QPU instance comprising a first assignment of the set of qubits to a plurality of qubit devices; and
a second QPU instance comprising a second, distinct assignment of the set of qubits to the plurality of qubit devices.

8. The quantum computing method of claim 1, wherein the plurality of distinct QPU instances includes:
a first QPU instance comprising a first subset of a plurality of qubit devices in a quantum processor cell; and
a second QPU instance comprising a second, distinct subset of the plurality of qubit devices in the quantum processor cell.

9. The quantum computing method of claim 1, wherein the quantum computation is defined for a set of qubits, and the plurality of distinct QPU instances includes:
a first QPU instance comprising a first assignment of the set of qubits to a first plurality of qubit devices in a first quantum processor cell; and
a second QPU instance comprising a second assignment of the set of qubits to a second plurality of qubit devices in a second quantum processor cell.

10. The quantum computing method of claim 1, comprising executing the quantum computation on at least two of the distinct QPU instances in parallel.

11. The quantum computing method of claim 1, comprising executing the quantum computation on at least two of the distinct QPU instances in series.

12. The quantum computing method of claim 1, comprising generating distinct control sequences associated with the distinct QPU instances, wherein executing the quantum computation on a distinct QPU instance comprises delivering the control sequence associated with the distinct QPU instance to a quantum processor cell.

13. The quantum computing method of claim 1, wherein the identifying and the selecting are executed on one or more classical processors.

14. The quantum computing method of claim 1, wherein the obtaining a set of execution results is repeated using the same control sequences on the respective QPU instances to provide multiple execution results for each instance.

15. The quantum computing method of claim 14, further comprising determining optimum instances to use and repeating the obtaining and the selecting with the optimum instances.

16. A hybrid computer system comprising a quantum processor unit (QPU) and one or more classical processors, the hybrid computer system being configured to perform operations comprising:
    identifying, using one or more classical processors, a plurality of distinct quantum processor unit (QPU) instances in a quantum computing system, each of the distinct QPU instances identified to execute a quantum computation;
    obtaining a set of execution results by executing the quantum computation on the plurality of distinct QPU instances, each execution result being obtained by executing the quantum computation on a respective one of the distinct QPU instances; and
    selecting, using the one or more classical processors, one of the execution results as an output of the quantum computation according to an evaluation criterion for the quantum computation.

17. The hybrid computer system of claim 16, wherein the obtaining a set of execution results is repeated using the same control sequences on the respective QPU instances to provide multiple execution results for each instance.

18. The hybrid computer system of claim 17, further comprising determining, using the one or more classical processors, optimum instances to use and repeating the obtaining and the selecting with the optimum instances.

19. The hybrid computer system of claim 16, wherein each of the distinct QPU instances includes a respective set of qubit devices selected from a plurality of qubit devices in a quantum processor cell, and identifying the plurality of distinct QPU instances comprises selecting an attribute of each distinct QPU instance based on a physical layout of the qubit devices in the quantum processor cell.

20. The hybrid computer system of claim 16, wherein identifying the plurality of distinct QPU instances comprises selecting an attribute of each distinct QPU instance by a random selection process.

21. The hybrid computer system of claim 16, wherein identifying the plurality of distinct QPU instances comprises selecting mutually exclusive sets of qubit devices for the distinct QPU instances, to allow the quantum computation to be executed on the plurality of distinct QPU instances in parallel.

22. The hybrid computer system of claim 16, wherein each of the distinct QPU instances includes a respective set of qubit devices, and identifying the plurality of distinct QPU instances comprises selecting the set of qubit devices for each distinct QPU instance based on a performance heuristic associated with at least one of the qubit devices in the set.

* * * * *